INVENTOR
GEORGE L. HILDEBRAND
HARRY C. WENDT

BY Richard E Horley

ATTORNEY

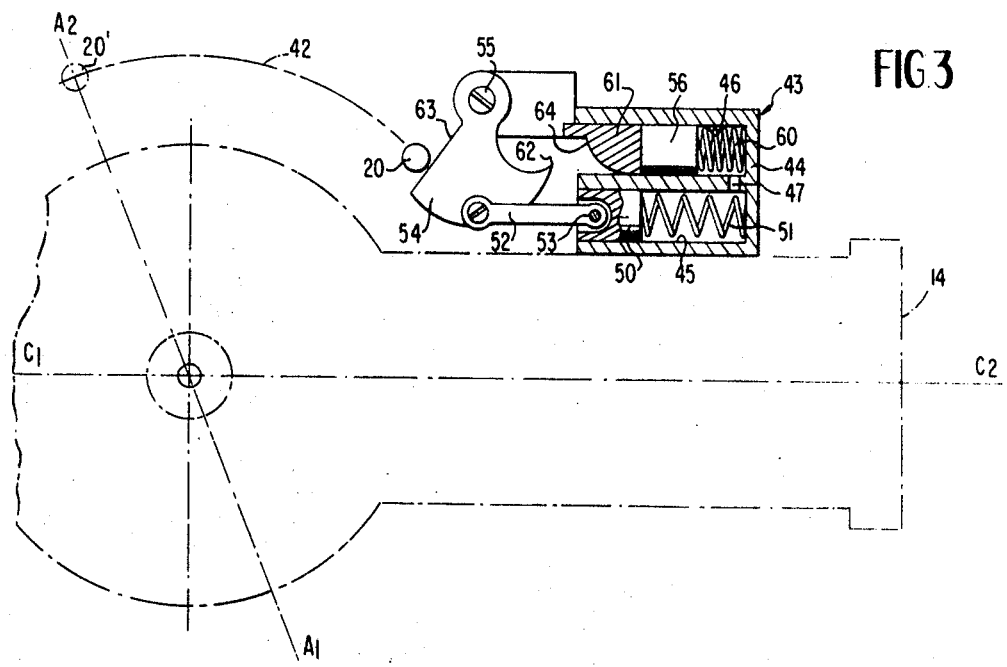
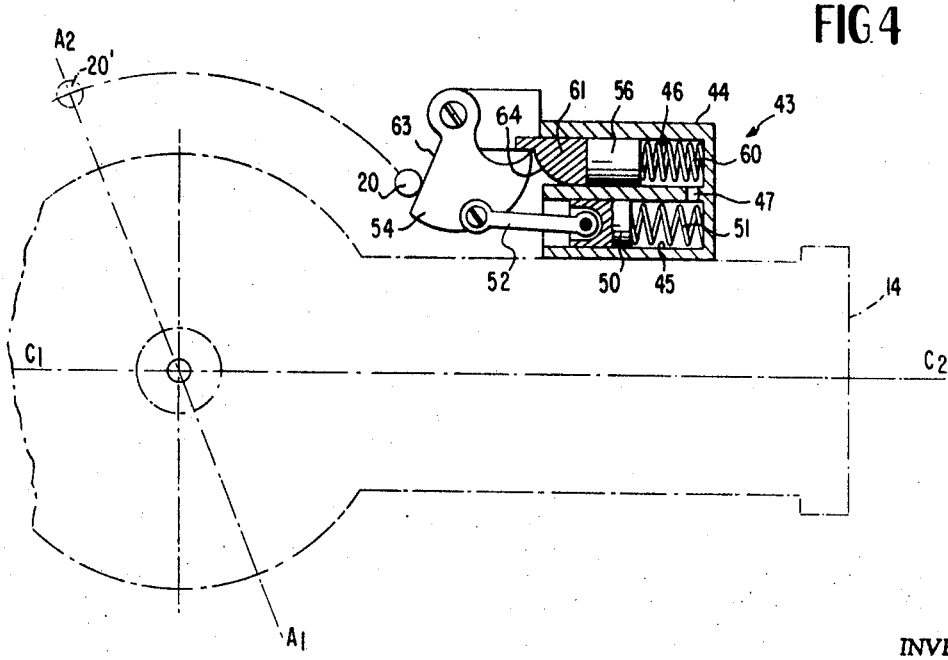

INVENTOR
GEORGE L. HILDEBRAND
HARRY C. WENDT

ATTORNEY

# United States Patent Office 3,470,752
Patented Oct. 7, 1969

3,470,752
PNEUMATICALLY ACTUATED ADJUSTABLE
STOP FOR GYROSCOPE
George L. Hildebrand, Marblehead, and Harry C. Wendt, Lynnfield, Mass., assignors to General Electric Company, a corporation of New York
Filed Dec. 13, 1966, Ser. No. 601,428
Int. Cl. G01c 79/04
U.S. Cl. 74—5.2
6 Claims

ABSTRACT OF THE DISCLOSURE

A gyroscope having improved gimbal lock prevention. A gimbal lock stop is provided which applies a stopping force to one of the gyroscope gimbals which force varies directly to the rate at which the gyroscope approaches the gimbal lock position. The variable stopping force is provided by a piston and dashpot arrangement.

---

This invention is related to gyroscopes and more specifically to adjustable high-angle gimbal stops used in such gyroscopes.

Recently, improvements for fixed high-angle gimbal stops described and claimed in Patent No. 2,730,813 to Allen T. Sinks, issued Jan. 17, 1956, and assigned to the same assignee as the present invention, have been made. These improvements, in one embodiment, adjust the high-angle gimbal stop in accordance with a loop rate defined by the rate at which the gimbals approach a gimbal lock position wherein the major and spin axes of the gyroscope become aligned. Various approaches are described and claimed in the application of Harry C. Wendt, Ser. No. 600,902, filed on Dec. 12, 1966, and assigned to the same assignee as the present invention.

These approaches all require generally complex and often cumbersome components to provide the zero spin axis orientation error. Furthermore, in some of these schemes the stop was "soft"; that is, no rigid mechanical assembly caused the stoppage so a slight movement of the stop occurred after it was engaged. While these conditions are completely satisfactory in some gyroscopes, there are other applications requiring positively engaging adjustable stops which are simply constructed to utilize a minimum space.

It is an object of this invention to provide a simply constructed, adjustable high-angle gimbal stop for a gyroscope.

Another object of this invention is to provide an adjustable high-angle gimbal stop which provides a positive stop angle in response to the rate at which the gyroscope approaches the gimbal lock position.

In essence, this invention is provided by a mechanical-pneumatic stop means which pneumatically positions a stop so rigid mechanical linkage stops the gimbals to thereby cause the required precession which avoids the gimbal lock position while minimizing errors in the spin axis orientation.

This invention is pointed out with particularity in the appended claims. A more thorough understanding of the above and further objects and advantages of this invention may be had by referring to the following detailed description taken in conjunction with the accompanying drawings wherein:

FIGURE 3 illustrates a preferred embodiment of an adjustable stop formed in accordance with this invention;

FIGURES 4 and 5 illustrate the adjustable stop shown in FIGURE 3 as it operates for different gimbal closure rates.

Figure 1:
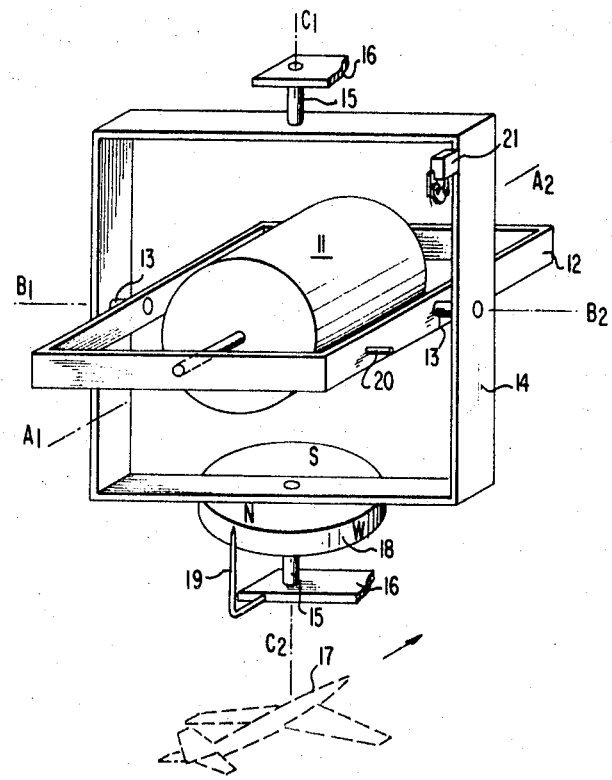
FIGURE 1 illustrates a gimbal arrangement for a directional gyroscope using this invention.

Referring to FIGURE 1 of the drawings, there is shown in schematic form a directional gyro azimuth indicating instrument comprising a rotor 11 mounted in an inner gimbal 12 for rotation about a horizontal spin axis $A_1$–$A_2$. The rotor 11 is driven by any suitable electric or pneumatic motor means, the showing of which has been omitted for the sake of clarity. The inner gimbal 12 is supported by means of trunnions 13 which are rotatably journaled in an outer gimbal 14 so that the inner gimbal 12 is free to pivot or rotate about a minor gimbal axis $B_1$–$B_2$ extending at right angles to the gyro spin axis $A_1$–$A_2$. The outer gimbal 14 is supported by trunnions 15 which are mounted in relatively fixed supports 16 so that the outer gimbal 14 is free to rotate about a normally vertical major gimbal axis $C_1$–$C_2$ extending at right angles to the trunnion axis $B_1$–$B_2$. The fixed supports 16 are attached to or form a part of the case of the instrument so that they move with the vehicle on which the instrument is mounted. In order to illustrate more clearly the relationship between the instrument and a vehicle on which it is mounted, an aircraft 17 is shown in phantom, it being understood that the fixed supports 16 are mounted on the aircraft 17.

Attached to the gimbal 14 is a conventional compass card 18 which is suitably marked with cardinal headings which are read against a stationary index or lubber line 19 mounted on one of the fixed supports 16. The gimbal supporting arrangement of the gyroscope is such that the gyro axes $A_1$–$A_2$, $B_1$–$B_2$, and $C_1$–$C_2$ all intersect at the center of gravity of the gyroscope. This is a conventional Cardan suspension giving three degrees of freedom of gyroscope movement relative to the fixed supports 16. Due to the characteristic gyroscope property of rigidity, the spin axis of the gyroscope tends to stay horizontal and the outer gimbal 14 and the compass card 18 are stabilized with reference to rotative movements of the fixed supports 16 in a horizontal plane. Therefore, the azimuth heading of the aircraft 17 is indicated by reading the headings on the compass card 18 against fixed lubber line 19.

In accordance with this invention, an adjustable stop means constituted by a pin 20 mounted on the inner gimbal 12 and a pneumatically positioned stop means 21 mounted on the outer gimbal 14 are located so that the stop pin 10 and the stop means 11 engage at some angle before the gimbal lock position to prevent this condition from being obtained. These elements are shown only schematically in FIGURE 1; however, the structure of one embodiment of a stop means 21 and its manner of operation are clearly set forth in the discussion of FIGURES 3–5.

Figure 2:
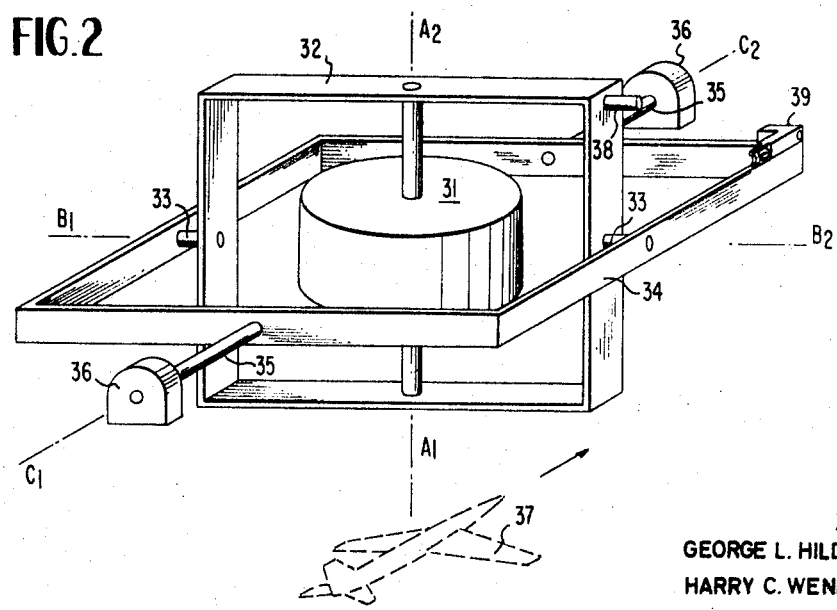
FIGURE 2 illustrates how this invention could be applied to a vertically oriented gyroscope.

FIGURE 2 illustrates how this invention may be applied to a vertical gyroscope normally used to measure or indicate pitch and roll. Such a gyroscope comprises a rotor 31 mounted on an inner gimbal 32 for rotation about a vertical spin axis $A_1$–$A_2$. Again, means for driving the rotor 31 are not shown for the sake of clarity. The inner gimbal 32 is supported by means of trunnions 33 rotatably journaled in an outer gimbal 34 so that the inner gimbal 32 is free to pivot or rotate about a minor gimbal axis $B_1$–$B_2$ extending at right angles to the spin axis $A_1$–$A_2$. The outer gimbal 34 is supported by trunnions 35 which are mounted in relatively fixed supports 36 so that the outer gimbal 34 is free to rotate about a normally horizontal major gimbal axis $C_1$–$C_2$ extending at right angles to the minor axis $B_1$–$B_2$. The fixed supports 36 are attached to or form a part of the case of the instrument so that they move with the vehicle on which the instrument is mounted, such a vehicle being denoted by an aircraft 37 shown in phantom. In order to measure roll, means would normally be provided to sense the rotation of the trunnions 35 about the major axis $C_1$–$C_2$, this rotation designating roll of the aircraft 37 when the axis $C_1$–$C_2$ runs fore and aft. If the gyroscope were mounted in this manner, pitch would be sensed by the relative rotation of the inner and outer gimbals 32 and 34. Such means for sensing pitch and roll are well known in the art and therefore are omitted for the sake of clarity.

A stop pin 38 is mounted on the inner gimbal member 32, and another embodiment of a pneumatically positioned stop means 39 is mounted on the outer gimbal member 24 to cause engagement of the stop pin 38 and the stop means 39 at an angle prior to the alignment of the spin axis $A_1$–$A_2$ with the major axis $C_1$–$C_2$.

Figure 5:
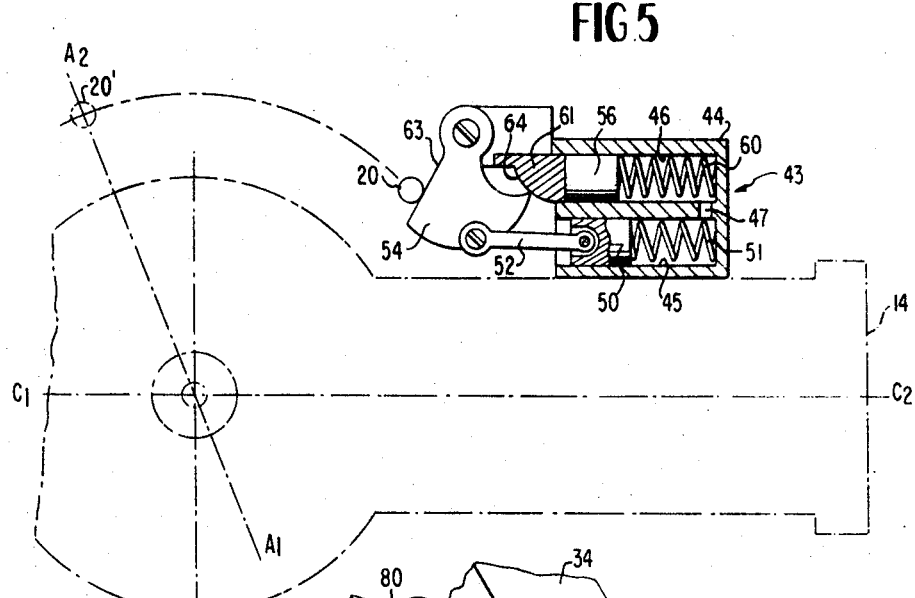
Figure 6:
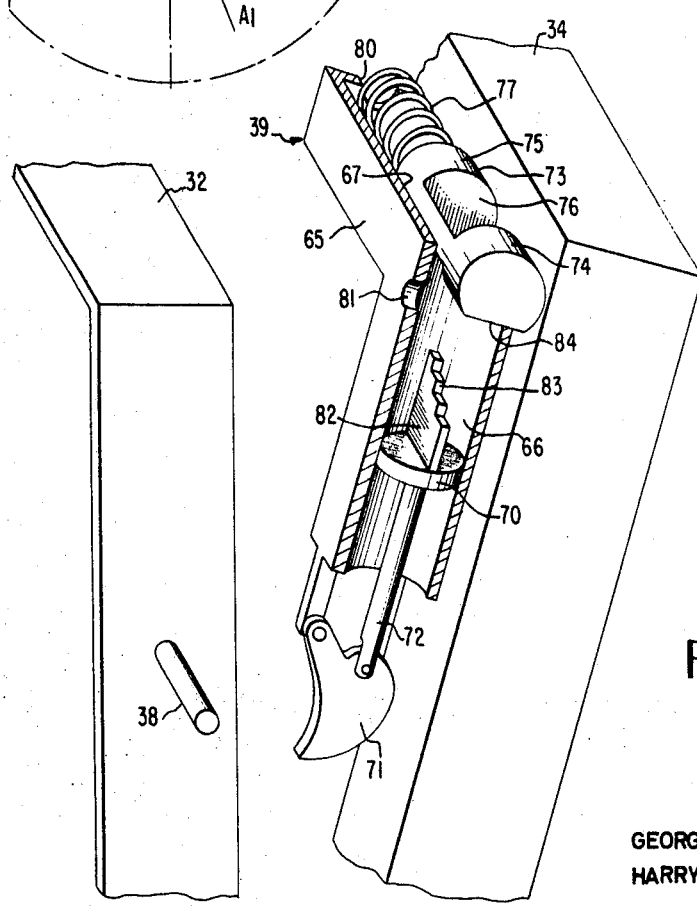
FIGURE 6 presents a partial sectional view of another embodiment of this invention.

As was clearly set forth in the above-mentioned Wendt application, the stop angle must vary as approximately the cube root of the rate at which the inner and outer gimbals close to eliminate spin axis orientation errors. FIGURES 3–5 present one such embodiment of a pneumatically positioned stop means which arbitrarily is shown as being mounted on an outer gimbal 14, the major axis being designated $C_1$–$C_2$. Although the following discussion assumes that the outer gimbal is stationary in space, this obviously is not true as the spin axis is the stationary reference. However, this assumption is made to facilitate the discussion and also to permit the use of simpler drawings. Actual conditions are shown in FIGURE 6 where the spin axis is shown in a vertical orientation. Although the inner gimbal 12 is not shown, the stop pin 20 is rotatable relative to the outer gimbal 14 along a circular path 42, the stop pin 20 rotating with the spin axis $A_1$–$A_2$. As shown in FIGURE 3, the circular path 42 extends past the position illustrated by the phantom view of the pin 20′ to the stop means generally designated 43. The pin 20 is about to engage the stop means 43 at a velocity which indicates the relative angular velocity between the inner and outer gimbals.

The stop means 43 comprises a housing 44 having two parallel cylindrical passages 45 and 46 interconnected by a passageway 47. A piston 50, in a sealing relationship with the housing 44, is initially located by a biasing piston spring 51. Movement of the piston 50 is controlled by a linkage including link 52, which is connected to the piston 50 by a pin 53, and an activator plate 54 pivoted about a shaft 55 mounted on the housing 44.

A second piston 56 and a spring 60 are located in the second passage 46 with controlled leakage around the second piston being permitted. A cam 61, affixed to the piston 56, engages a surface 62 on the activator plate 54 while another portion 63 of the activator plate 54 is engaged by the stop pin 20. A cam surface 64 serves as an engaging portion on the cam 61. As will be obvious from viewing FIGURE 3, the farther to the left the piston 56 is forced, the greater the stop angle which will be produced.

In order to show the operation of the device, FIGURES 4 and 5 reveal the gimbal stop position for two gimbal closure rates. Specifically, in FIGURE 4 the closure rate was slower than that of FIGURE 5 so a greater stop angle is set. As soon as the stop pin 20 engages the surface 63, the piston 50 is forced to the right at a rate determined by the relative angular velocity between the inner gimbal 12 and the outer gimbal 14. Fluid in the passage 45 is compressed and builds up a pressure which is transmitted to the passage 46 through the passageway 47. With properly controlled leakage about the piston 56, a dashpot is created which produces a force which varies approximately linearly with rate. If the spring 60 also has a linear force-displacement characteristic, the net force applied to the piston 56 displaces the piston 56 and the cam 61 outwardly by an amount which is approximately linearly proportional to the gimbal closure rate.

Hence, for maneuvers involving slow gimbal closure rates, the activator plate 54 is pivoted to a maximum degree as shown in FIGURE 4; and a minimum stop angle is thereby provided when the pin 20 comes to rest. When the gimbal closure rate is increased, the activator plate 54 engages the cam 61 at less of an angle and the pin 20 does not travel as far, providing a larger stop angle.

The exact stop angles which are provided by this embodiment of the stop means are dependent upon the shape of the cam surface 64. If the position of the cam 61 varies linearly with the gimbal closure rate, the cam surface 64 is shaped as the closure rate-stop angle characteristics for a gyroscopic device. When this linkage comes to rest, a rigid assembly exists between the gimbals as the force exerted by the pin 20 is transmitted through the activator plate 54, the cam 61, the piston 56, and the housing 44 to the gimbal 14.

The embodiment of this invention shown in FIGURE 6 is particularly adapted for gyroscopes subjected to accelerations along the major axis as the gimbal lock position is approached, such as those often encountered in looping maneuvers. Therefore, the discussion of the stop means is based on its application to the vertical gyroscope in FIGURE 2.

In FIGURE 6 the gyroscope configuration illustrates the approach of gimbal lock wherein the gimbal 34 is nearly aligned with the inner gimbal 32; the stop pin 38 is about to engage the stop means 39. The stop means is in a housing 65 which includes first and second perpendicularly oriented communicating passages 66 and 67. Disposed in the passage 66 is a piston 70 which is in a sealing engagement with the housing 65 and which is connected to an activator plate 71 by a link 72. The activator plate 71 is pivotally mounted to the housing so as to be struck by the stop pin 38 near the gimbal lock position.

Another piston 73, disposed in passage 67, has a slot defined by end portions 74 and 75. End portion 75 has a face 76 which is subjected to pressure from a fluid in the chambers. The position of the piston 73 is dependent upon the force developed on the face 76 and the counter force developed by a spring 77 disposed between the opposite face on the end portion 75 and the open wall 80 of the housing 65.

The force developed on the face 76 by dashpot action is controlled by a metering vent 81 which communicates with the chamber 66 and the atmosphere. When the stop pin 38 strikes the activator plate 71, it displaces the piston 70 inwardly, which increases the pressure between the pistons 70 and 73 so a force is produced on the face 76 which varies with the speed of the piston 70. The faster the speed of the piston 70 becomes, the farther toward the wall 80 the piston 73 is displaced.

The stop angle is set by a plate 82 mounted on the piston 70 so as to form a stepped cam surface 83 formed so that the piston is displaced inwardly until one cam surface 83 in the plate 82 engages a flat 84 formed on the end portion 74 of the piston 73. Hence, the inward displacement of the plate 82, until one cam surface engages the flat 84, increases as the rate of movement of the piston 70 decreases because the piston 73 is displaced a small distance to provide a stop angle which decreases as the gimbal closure rate decreases. The stop angle is positive because there is direct contact from the inner gimbal 32 through the stop pin 38, the activator plate 71, the link 72, the piston 70, the plate 82, and the piston end portion 74 to the housing 65 on the outer gimbal 34.

From the above discussion it will now be apparent that the stop means illustrated in FIGURES 3 and 6 provide the objects and advantages discussed above. An adjustable stop means is provided in accordance with this invention to interfere with gimbal rotation to stop such rotation at a particular angle before the gimbal lock position is obtained. The particular stop angle provided by this invention varies in accordance with the gimbal closure rate; furthermore, when the stop is engaged, a rigid mechanical linkage is provided between the inner and outer gimbals to provide a definite stop position for each closure rate.

Although the foregoing is a description of two illustrative embodiments of this invention, it is anticipated that modifications to the adjustable stop means used to convert the input rate to a variable stop position can be made without departing from the spirit and scope of this invention. It is the intention of the appended claims to cover all forms which come within the spirit and scope of the invention.

What is claimed as new and desired to be secured by Letters Patent of the United States is:

1. In a gyroscopic device including an inner gimbal, a rotatable mass mounted on the inner gimbal for rotation about a spin axis, means for rotating the mass, an outer gimbal, means mounting the inner gimbal on the outer gimbal for rotation about a minor axis perpendicular to the spin axis, a maneuverable support means, means mounting the outer gimbal on the support means for rotation about a major axis perpendicular to the minor axis, the gyroscopic device being maneuverable to a position whereupon the spin and major axes tend to align, the improvement of means preventing the alignment of the spin and major axes comprising:
   (a) sensing means for sensing the gimbal closure rate at which the spin and major axes come into alignment;
   (b) first conversion means responsive to said sensing means producing a force which varies with said closure rate;
   (c) second conversion means responsive to said force having means positioned by said force, the final position of said second conversion means indicating the gimbal closure rate; and
   (d) interference means responsive to said positioned means to cause interference between the gimbals to thereby stop relative rotation between the gimbals at an angle before the alignment of the spin and major axes determined by said closure rate.

2. A gyroscopic device as recited in claim 1, said sensing means including a pin mounted on one gimbal and said first conversion means including dashpot means, an element of said dashpot means being engageable by said pin to indicate gimbal closure rate by producing a force on said second conversion means which indicates the gimbal closure rate.

3. A gyroscope as recited in claim 2 wherein said second conversion means is mounted on the other gimbal and connected to said dashpot means and wherein said interference means includes cam means positioned by said second conversion means in response to said force developed by said dashpot means and means including said dashpot input member for stopping relative rotation between the gimbals, said cam means having a cam surface which varies the stop angle to minimize gyroscope error.

4. A gyroscope as recited in claim 2 having a housing mounted on the other gimbal, said housing having first and second piston means mounted therein, said sensing means including said first piston means, said first piston means being in a sealing engagement with said housing and being engageable by said pin, a fluid in said housing, said first conversion means including means permitting controlled escape of said fluid from said housing so that motion of said first piston means produces a force on said second piston means which varies substantially linearly with the rate of motion of said first piston means.

5. A gyroscope as recited in claim 4, the second conversion means including a spring connected between said housing and said second piston to produce a counterforce on said second piston in opposition to said force produced by said dashpot means so that the second piston is positioned substantially linearly with the gimbal closure rate.

6. In a gyroscopic device including an inner gimbal, a rotatable mass mounted on the inner gimbal for rotation about a spin axis, means for rotating the mass, an outer gimbal, means mounting the inner gimbal on the outer gimbal for rotation about a minor axis perpendicular to the spin axis, a maneuverable support means, means mounting the outer gimbal on the support means for rotation about a major axis perpendicular to the minor axis, the gyroscopic device being maneuverable to a position where the spin and major axes tend to move into alignment, the improvement of means preventing movement of the gimbals to a gimbal lock position wherein the spin and major axes align comprising:
   (a) a housing having first and second interconnected passages;
   (b) first and second pistons in said first and second passages, respectively, a fluid being present in said passages between said first and second pistons;
   (c) means for connecting said first piston to one of the gimbals within a few degrees of the gimbal lock position to move said first piston toward said second piston;
   (d) means permitting a controlled escape of said fluid at a rate which causes a force to be produced on the said second piston indicating the gimbal closure rate;
   (e) spring means connected to said second piston and said housing having a characteristic of producing a counterforce on said second piston of a magnitude which allows said second piston to move to a predictable position in response to the gimbal closure rate; and
   (f) a cam mounted on said first piston for engaging said second piston when said second piston is properly positioned, said first piston being positioned by the engagement of said cam and said second piston to cause relative rotation of the gimbals to stop at an angle which produces rotation of the outer gimbal without error in the spin axis orientation.

References Cited

UNITED STATES PATENTS

| | | | |
|---|---|---|---|
| 2,439,358 | 4/1948 | Divoll | 74—5.2 |
| 2,493,015 | 1/1950 | Newton | 74—5.2 |
| 3,142,181 | 7/1964 | Moller | 74—5.5 X |

ROBERT A. O'LEARY, Primary Examiner

WILLIAM E. WAYNER, Assistant Examiner